United States Patent Office 3,291,200
Patented Dec. 13, 1966

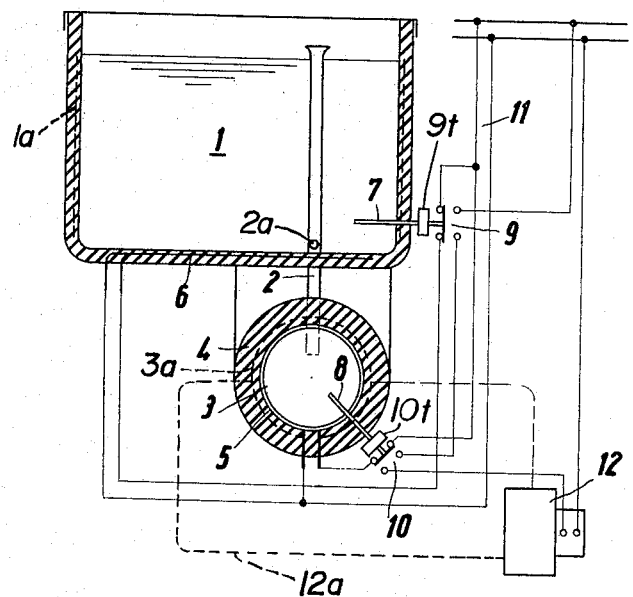

3,291,200
FOOD ICE MACHINE WITH HEATING MEANS THEREFOR
Hans Georg Lutz, Hans-Hacker-Str. 9, Kulmbach, Germany
Filed Sept. 18, 1964, Ser. No. 397,476
Claims priority, application Germany, Sept. 23, 1963, L 45,931
8 Claims. (Cl. 165—12)

Food ice machines must meet severe requirements regarding freedom from germs in the ice to be dispensed. Therefore, not only the use of germ-free initial mixes is required, but also extreme cleanliness in the operation of the ice machines or freezers, particularly the careful cleaning thereof after each period of operation. As a rule the supply container, the freezer and the connecting lines must be emptied daily and cleaned. This requires an expenditure of time that increases the operating costs and does not entirely preclude new germ development and dangerous multiplication of germs during the operation. The inclusion of an additional sterilizing apparatus in the food ice machine increases the costs of the installation and is only economical in connection with larger installations, but not with the conventional smaller soft ice freezers.

The invention which is applicable to food ice freezers of the type covered by U.S. Patent No. 3,183,681, where applicant appears as a co-inventor, provides simple means for overcoming the problem. In accordance with the invention the freezing vessel of the ice machine and/or the supply container therefor is provided with heating means of such capacity that the contents are raised to a temperature sufficient to eliminate the germs, preferably 70 to 75° C. The contents of the freezing vessel or of the supply container can be heated during the intervals between operations to a temperature sufficient for pasteurization, so that germs are killed and the required freedom from germs in the food ice to be dispensed is insured.

Preferably the heating operation is performed electrically and can be automatically controlled, for example, by means of one or several temperature switches mounted on the ice freezing machine, so that after attaining the required de-germing temperature and the de-germing time period, it is automatically turned off, and at the same time the refrigerating system is turned on, by starting the cooling compressor for producing the cold temperature.

Further features and advantages of the invention will become apparent from the following specification with reference to the drawing, which shows a simplified form in section an embodiment of the invention. The food ice freezer has a supply container 1 for the initial mix such as soft ice mix which is connected by way of an intake or mix tube 2 and a connecting channel with the freezer compartment 3. A lateral aperture 2a in mix tube 2 provides for passage of the mix. The freezer compartment 3 is provided inside of its cooling insulation 4 with an annular heating body 5 of conventional construction, while the supply container 1 is provided with a heating element 6 in the bottom thereof. The cooling coils 3a and 1a that are supplied with the refrigerant and surround the freezing compartment 3 and the container 1, respectively, as well as the connecting ducts 12a leading to the refrigerating unit 12 are merely indicated in broken lines because they are known per se. The freezing compartment may be of the type illustrated in the aforementioned U.S. Patent No. 3,183,681, which is provided with a device for dispensing food ice in portions.

The containers 1 and 3 are each provided with a temperature feeler 7 or 8, which feelers act upon the associated contact means 9, 10, respectively, which may be adjustable to the correct operating time period in a manner known per se. For example, contact means 9, 10 may be provided with conventional timing devices as indicated at 9t and 10t. These timing devices start to run when the contacts 9, 10 are operated to supply current to the heating elements 6 and 5, respectively, and release the switches when the time for which they are set has expired. After the required de-germing temperature has been attained and has acted upon the contents of the soft ice freezer during a sufficient period of time, these temperature switches automatically interrupt the electric circuit 11 which supplies the heating elements 5 and 6 and subsequently cut in the compressor of the refrigerating unit 12 which serves to produce the freezing temperature. The electric circuits may suitably also be provided with manual switches to provide for their optional operation.

In the embodiment illustrated it is assumed that the pairs of contacts of the two switching devices 9 and 10 which are in the circuit 11 of the heating current are connected in parallel, while the pairs of contacts in the motor circuit of the compressor are connected in series. The heating current circuit 11 thus is first interrupted and the motor current circuit of the compressor of unit 12 is only closed if both temperature switches have responded.

In various cases it may be sufficient if only one heating element is provided, preferably the element 6 on the supply container, or only one temperature feeler, preferably the feeler 7 with the associated switch contacts. The heating elements 5 and 6 can also be in the form of grates made of heating rods spaced at a distance from one another.

As a rule it is suitable to have a circulating means which keeps the ice mix in rotation during the time necessary for the de-germing operation, so that all parts of the supply may be safely subjected to the de-germing temperature.

Having now described my invention with reference to the embodiment illustrated in the drawing, I do not wish to be limited thereto, but what I desire to protect by Letters Patent of the United States is set forth in the appended claims.

1. In a food ice machine for dispensing food ice in portions of the type comprising a freezing compartment, a supply container for ice mix, an intake passage intermediate said supply container and said freezing compartment and freezing means comprising a refrigerating unit for supplying coolant to said freezing compartment and having a compressor, heating means including heating elements in said freezing compartment and in said supply container operative to heat the contents to a degerminating temperature, preferably between 70 and 75° C. and current supply means connected to a current source for supplying current to said compressor and to said heating means, including separate temperature responsive switch means, one associated with said freezing compartment and one with said supply container, each said switch means having a pair of contacts in one position thereof connecting said heating elements in parallel to said current source, and having a pair of contacts in another position connecting said compressor in series with said current source.

2. In a food ice machine in accordance with claim 1, the further improvement that each said switch means is temperature responsive and includes a timing device operative to control the period of operation of its switch means.

3. In a food ice machine in accordance with claim 2, the further improvement that the heating element in said freezing compartment is an annular heating element separated from the interior of said compartment by insulating means.

4. In a food ice machine in accordance with claim 2, the further improvement that said switch means include temperature responsive members, one extending into said supply container from one switch and one extending into said freezing compartment from the other switch, and that external switch elements are movable by said temperature responsive members between the associated pairs of contacts.

5. In a food ice machine in accordance with claim 1, the further improvement that the heating element in said freezing compartment is an annular heating element separated from the interior of said compartment by insulating means.

6. In a food ice machine in accordance with claim 5, the further improvement that the heating element for said supply container is arranged in the bottom of said container.

7. In a food ice machine in accordance with claim 1, the further improvement that said switch means include temperature responsive members, one extending into said supply container from one switch and one extending into said freezing compartment from the other switch, and that external switch elements are movable by said temperature responsive members between the associated pairs of contacts.

8. In a food ice machine in accordance with claim 1, the further improvement that the heating element for said supply container is arranged in the bottom of said container.

References Cited by the Examiner
UNITED STATES PATENTS

| | | | |
|---|---|---|---|
| 1,896,953 | 2/1933 | Hassell | 165—26 X |
| 2,527,894 | 10/1950 | Tacchella | 62—342 X |
| 2,623,449 | 12/1952 | Losee | 165—12 X |
| 3,183,681 | 5/1965 | Lutz et al. | 62—342 X |

FOREIGN PATENTS 901,420   1/1954   Germany.

ROBERT A. O'LEARY, *Primary Examiner.*

M. A. ANTONAKAS, *Assistant Examiner.*